(12) United States Patent
Dahl (10) Patent No.: US 10,287,870 B2
(45) Date of Patent: May 14, 2019

(54) DRILL PIPE MONITORING AND LIFETIME PREDICTION THROUGH SIMULATION BASED ON DRILLING INFORMATION

(71) Applicant: Thomas G. Dahl, Schwuelper (DE)

(72) Inventor: Thomas G. Dahl, Schwuelper (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 78 days.

(21) Appl. No.: 15/189,163

(22) Filed: Jun. 22, 2016

(65) Prior Publication Data

US 2017/0370204 A1    Dec. 28, 2017

(51) Int. Cl.
| | |
|---|---|
| E21B 12/02 | (2006.01) |
| E21B 47/00 | (2012.01) |
| E21B 7/00 | (2006.01) |
| E21B 21/08 | (2006.01) |
| E21B 47/024 | (2006.01) |
| E21B 47/06 | (2012.01) |
| E21B 47/12 | (2012.01) |
| E21B 17/00 | (2006.01) |
| G06Q 10/08 | (2012.01) |

(52) U.S. Cl.
CPC ............ *E21B 47/0006* (2013.01); *E21B 7/00* (2013.01); *E21B 17/006* (2013.01); *E21B 21/08* (2013.01); *E21B 47/024* (2013.01); *E21B 47/06* (2013.01); *E21B 47/065* (2013.01); *E21B 47/122* (2013.01); *G06Q 10/087* (2013.01)

(58) Field of Classification Search
CPC ................................ E21B 12/02; E21B 45/00
See application file for complete search history.

(56) References Cited

U.S. PATENT DOCUMENTS

| | | |
|---|---|---|
| 5,202,680 A | 4/1993 | Savage |
| 7,468,678 B2 | 12/2008 | Shah et al. |
| 7,688,210 B2 | 3/2010 | Staff |

(Continued)

FOREIGN PATENT DOCUMENTS

| | | |
|---|---|---|
| EP | 1915504 A1 | 6/2010 |
| WO | 2016040148 A1 | 3/2016 |

OTHER PUBLICATIONS

Baryshbikov, et al; "A New Approach to the Analysis of Drillstring Fatigue Behavior"; SPE Drilling & Completion; Jun. 1997; 8 pages.

(Continued)

*Primary Examiner* — Kenneth L Thompson
(74) *Attorney, Agent, or Firm* — Cantor Colburn LLP (57) ABSTRACT

An apparatus for drilling a borehole in an earth formation includes: a plurality of drill pipes configured to be coupled together to form a drill string that is configured to convey an earth formation disintegrating device while progressing into the earth formation; a communication medium disposed on the drill string and configured to communicate a signal; and one or more processors. The one or more processors are configured to: receive drilling information; determine a stress distribution along at least a part of the drill string using the drilling information; determine a cumulative fatigue damage of at least a part of one drill pipe in the drill string using the stress distribution; and write the cumulative fatigue damage of the at least a part of one drill pipe to a memory.

21 Claims, 7 Drawing Sheets

(56) References Cited

U.S. PATENT DOCUMENTS

| | | | |
|---|---|---|---|
| 8,439,130 B2 | 5/2013 | Degrange et al. | |
| 8,463,664 B2 | 6/2013 | Griggs et al. | |
| 8,504,308 B2 | 8/2013 | Li et al. | |
| 8,636,060 B2 | 1/2014 | Hernandez | |
| 8,704,677 B2 | 4/2014 | Prammer | |
| 8,851,175 B2 | 10/2014 | Onadeko et al. | |
| 8,928,488 B2 | 1/2015 | Rodney et al. | |
| 9,030,324 B2* | 5/2015 | Christiansen | H04Q 9/00 340/12.18 |
| 9,128,019 B2 | 9/2015 | Wayman et al. | |
| 9,637,981 B2* | 5/2017 | Kirkhope | G01N 3/56 |
| 2005/0283276 A1 | 12/2005 | Prescott et al. | |
| 2011/0088910 A1 | 4/2011 | McCann et al. | |
| 2012/0061091 A1 | 6/2012 | Radi | |
| 2013/0063277 A1 | 3/2013 | Christiansen | |
| 2013/0256032 A1* | 10/2013 | Palmer | E21B 12/02 175/39 |
| 2014/0041865 A1 | 2/2014 | Paulk et al. | |
| 2014/0353037 A1 | 12/2014 | Rasmus et al. | |
| 2015/0106015 A1 | 4/2015 | Dashevskiy et al. | |
| 2015/0211360 A1 | 7/2015 | Adsit | |
| 2015/0300151 A1* | 10/2015 | Mohaghegh | E21B 41/0007 702/9 |
| 2016/0047223 A1 | 2/2016 | Li et al. | |
| 2016/0273330 A1* | 9/2016 | Dashevsky | E21B 47/0905 |
| 2017/0159371 A1* | 6/2017 | Aniket | E21B 47/00 |
| 2017/0175515 A1* | 6/2017 | Aniket | E21B 47/00 |

OTHER PUBLICATIONS

Camwell, et al.;"Acoustic Telemetry, With Multiple Nodes in Drillstring, Used to Achieve Distributed MWD"; Innovating While Driling; (2009); 6 pages.

McNeill, et al.; "Intelligent Wired Drill-Pipe System Allows Operators to Take Full Advantage of Latest Downhole Sensor Developments"; International Petroleum Technology Conference;(2008); 7 pages.

Paslay, et al.; "Bending Stress Magnification in Constant Curvature Doglegs with Impact on Drillstring and Casing"; Society of Petroleum Engineers Inc. (1991); 10 pages.

Schlumberger; "Power Drive Archer";(2013) 7 Pages.

Vaisberg, et al.; "Fatigue of Drillstring: State of the Art";vol. 57 (2002); 31 pages.

International Search Report and the Written Opinion of the International Searching Authority, or the Declaration; PCT/US2017/038459; dated Oct. 20, 2017; 13 pages.

* cited by examiner

DRILL PIPE MONITORING AND LIFETIME PREDICTION THROUGH SIMULATION BASED ON DRILLING INFORMATION

BACKGROUND

Boreholes are drilled into earth formations for various purposes such as hydrocarbon production, geothermal production and carbon dioxide sequestration. The boreholes may be drilled with drilling system components that are subject to mechanical stress, pressure, and temperature. As the drilling system components are subject to varying operating conditions such as alternating stress cycles and may be used over and over again to drill many boreholes, these components may be subject to damage from fatigue. If any of these components fail during operation, then drilling operations may be shut down while the failed component is retrieved from the borehole and repaired or replaced resulting in increased drilling costs. Hence, apparatus and method to forecast and prevent potential problems with drilling system components would be well received by the drilling industry.

BRIEF SUMMARY

Disclosed is an apparatus for drilling a borehole in an earth formation. The apparatus includes: a plurality of drill pipes configured to be coupled together to form a drill string that is configured to convey an earth formation disintegrating device while progressing into the earth formation; a communication medium disposed on the drill string and configured to communicate a signal; and one or more processors. The one or more processors are configured to: receive drilling information; determine a stress distribution along at least a part of the drill string using the drilling information; determine a cumulative fatigue damage of at least a part of one drill pipe in the drill string using the stress distribution; and write the cumulative fatigue damage of the at least a part of one drill pipe to a memory.

Also disclosed is a method for drilling a borehole in an earth formation. The method includes: conveying an earth formation disintegrating device while progressing into the earth formation using a plurality of drill pipes configured to be coupled together to form a drill string; communicating a signal using a communication medium disposed on the drill string; receiving with one or more processors drilling information; determining with the one or more processors a stress distribution along at least a part of the drill string using the drilling information; determining with the one or more processors a cumulative fatigue damage of at least a part of one drill pipe in the drill string using the stress distribution; and writing with the one or more processors the cumulative fatigue damage of the at least a part of one drill pipe to a memory.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are apparatus and methods for drilling a borehole in an earth formation. Specifically, the apparatus and methods are used to forecast potential problems with drill pipes in a drill string that drill the borehole. Fatigue due to alternating mechanical stress superimposed to steady state stresses from bending moment, axial and torsional loading, pressure differences and temperature is simulated using an algorithm executed by a processor that receives data concerning loads and rotation applied to the drill string at the surface. In addition, measured downhole loads may also be input into the algorithm. A state of mechanical stress for each drill pipe in a drill string is calculated during the simulation for a time step and summed for all time steps to determine cumulative fatigue damage. The cumulative fatigue damage is written into a memory device located either at the surface or disposed downhole in one or more of the drill pipes. If the memory device is downhole, it can be written to while it is downhole using wired drill pipe. Similarly, the memory device can be read while the memory device is downhole using the wired drill pipe. The cumulative fatigue damage can alternatively be written to and read from the memory device while the drill pipes are at the surface. Hence, a drilling operator can know the extent of damage due to fatigue for each drill pipe in a drill string or each drill pipe that is about to be used in a drill string. With this knowledge, the drilling operator can have a drill pipe repaired or replaced if the damage is close to a fatigue limit before the drill pipe actually fails.

Figure 1:
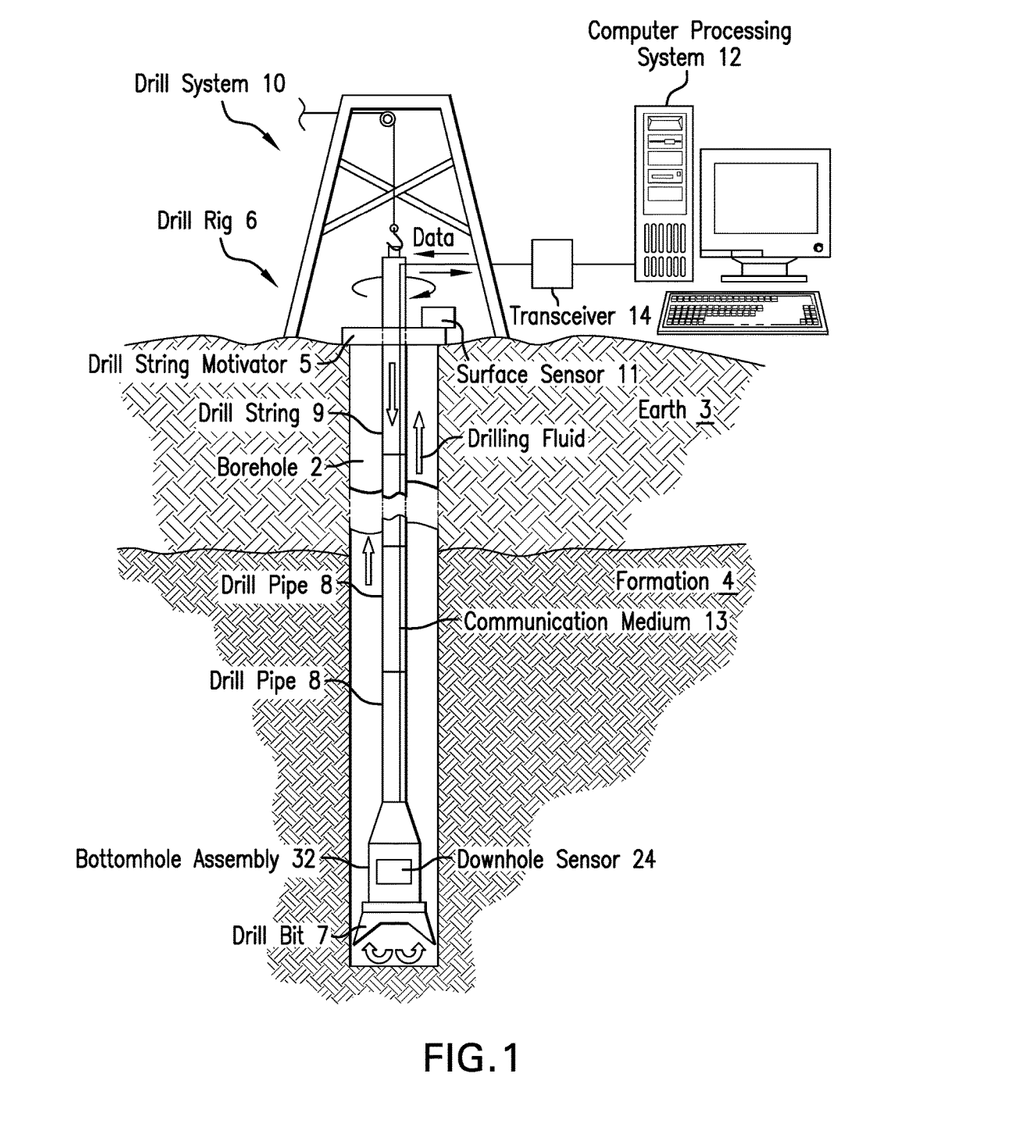
FIG. 1 is a cross-sectional view of an embodiment of a drilling system.

FIG. 1 illustrates a cross-sectional view of a drilling system 10. A drill string 9 is disposed in a borehole 2 (also referred to as a wellbore) penetrating the earth 3, which includes a formation 4. In one or more embodiments, the borehole 2 may be lined with a casing (not shown). An earth formation disintegrating device, such as a drill bit 7, is disposed at the distal end of the drill string 9 and is configured to cut or disintegrate formation rock to drill the borehole 2. The drill string 9 is made up of a series of drill pipes 8 that are coupled together generally by a threaded coupling. A drill rig 6 is configured to operate the drill string 9 and includes a drill string motivator 5 configured to apply a downward force and torque on the drill string 9 and thus rotate the drill string 9 and the drill bit 7 in order to drill the borehole 2. Alternatively, a downhole motor or turbine (not shown) may rotate the drill bit configured to cut or disintegrate formation rock to drill the borehole 2. The drill rig 6 may also pump drilling fluid or mud through the interior of the drill string 9 in order to lubricate the drill bit 7 and flush cuttings from the borehole 2. One or more surface sensors 11 and/or downhole sensors 24 may sense and measure drilling information related to drilling the borehole 2 and input sensed data into a surface computer processing system 12. Non-limiting embodiments of the drilling information include surface data, also referred to as surface loads, such as axial load, applied drill string torque, rotary speed (RPM), block height, mud flow rate in, mud flow rate out, mud temperature-in and temperature-out, mud pressure-in and pressure-out, borehole and/or sensor depth and time. In general, the one or more downhole sensors 24 are configured to sense downhole loads on the drill string 9. In the embodiment of FIG. 1, the one or more downhole sensors 24 are shown disposed in a bottomhole assembly (BHA) 32, which may or may not include the drill bit 7. In an alternative embodiment, one or more downhole sensors 24 may be located at other locations distributed along the drill string 9.

Secured to each drill pipe 8 is a communication medium 13. Non-limiting embodiments of the communication medium 13 include a wire having metallic conductors and an optical fiber. The communication of the signal along at least a part of the drill string may alternatively be executed by electromagnetic (EM) telemetry. In EM telemetry, a signal is transmitted via electromagnetic waves through the formation. At each drill pipe joint is a signal coupler (not shown), such as a galvanic coupler, radio frequency (RF) resonance coupler, EM inductive coupler or others configured to receive a signal from a corresponding signal coupler in an adjacent drill pipe and to transmit that signal along the communication medium in the drill pipe having the signal coupler. Disposed at the surface is a transceiver 14 configured to transmit a signal downhole along the drill string 9 using the communication medium 13 and to receive a signal transmitted from a location on the drill string downhole. The transceiver 14 may include a communications interface to communicate data with the surface computer processing system 12. The signals communicated by the communication medium 13 may include the downhole measurements, information, data, processed data, memory data and/or calculations discussed further below. For example, data processed downhole may be transmitted to the surface computer processing system 12 and/or information required for downhole processing may be transmitted downhole from the surface computer processing system 12 using the communication medium 13.

Figure 2:
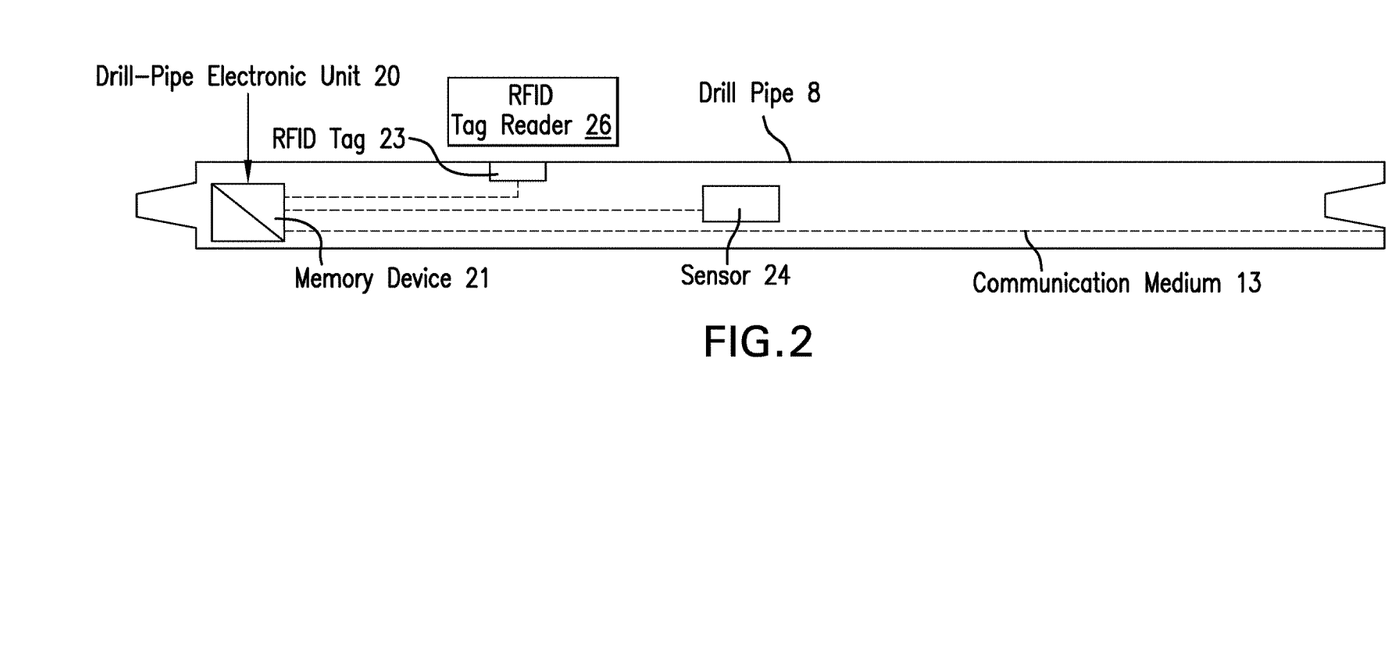
FIG. 2 depicts aspects of one embodiment of a drill pipe.

FIG. 2 depicts aspects of one embodiment of the drill pipe 8. In the embodiment of FIG. 2, the drill pipe 8 includes one or more drill-pipe electronic units 20 in the drill pipe 8. The drill-pipe electronic unit 20 may include a memory device 21. The memory device 21 is configured to store data on a non-transitory computer-readable storage medium and to provide data when required such as in response to a request signal. The electronic unit may include a repeater (not shown). In one or more embodiments, the memory device has a unique address identifying the drill pipe in which the memory device 21 is located. The repeater is configured to repeat or relay or amplify a signal received from one end of the drill pipe to the other end of the drill pipe to provide bi-directional communications. In one or more embodiments, a radio-frequency identification (RFID) tag 23 with memory capability may be coupled to the drill-pipe electronic unit 20. The RFID tag 23 with memory capability is configured to store cumulative fatigue damage data and to transmit that data to an RFID tag reader 26 when the corresponding drill pipe 8 is retrieved out of the borehole 2. While the embodiment of FIG. 2 illustrates one drill pipe 8 having one drill-pipe electronic unit 20, in other embodiments, one drill pipe 8 may have more than one drill-pipe electronic unit 20. In another embodiment only one or more selected drill pipes may have a drill-pipe electronic unit.

Still referring to FIG. 2, the downhole sensor 24 is disposed on the drill pipe 8. The sensor 24 is in communication with the drill-pipe electronic unit 20 for communicating sensed data to the transceiver 14 and the surface computer processing system 12. The sensor 24 is configured to sense various downhole parameters. Non-limiting embodiments of the sensed parameters are mechanical stress, such as bending moment, torque, and axial load. Sensed downhole parameters may also be temperature, pressure, and acceleration including vibrations. In general, the sensed parameters include those which may cause fatigue damage to the drill pipe 8.

Figure 3:
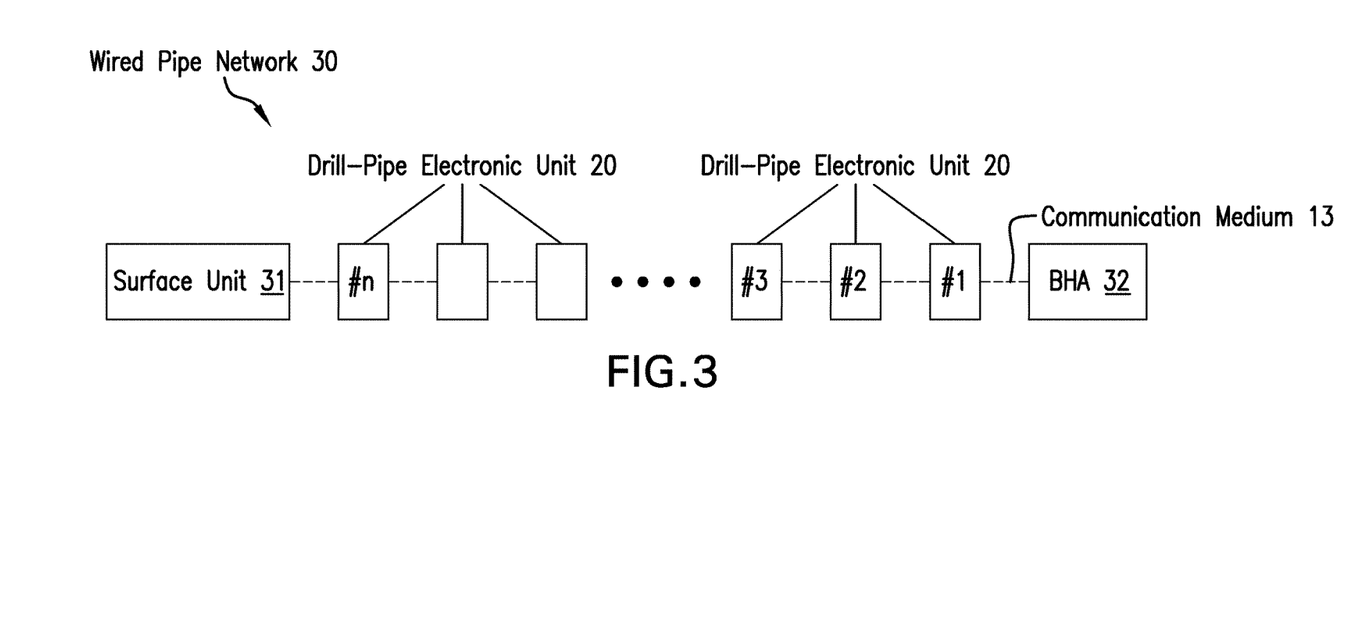
FIG. 3 depicts aspects of a series of drill-pipe electronic units having memory devices disposed in drill pipes in a drill string.

FIG. 3 depicts aspects of a wired pipe network 30 having "n" drill-pipe electronic units 20 in series because the drill pipes 8 are also in series. The surface unit 31 may be the transceiver 14 and/or the computer processing unit 12. At the end opposite the surface unit 31 is the bottomhole assembly (BHA) 32. The BHA 32 may also include the drill-pipe electronic unit 20 and the sensor 24. In addition, the BHA 32 may also include the drill bit 7, hole-opening or reaming devices, a steering unit and a mud motor or turbine. Components in the BHA 32 may also be controlled by the surface computer processing system 12.

Figure 4:
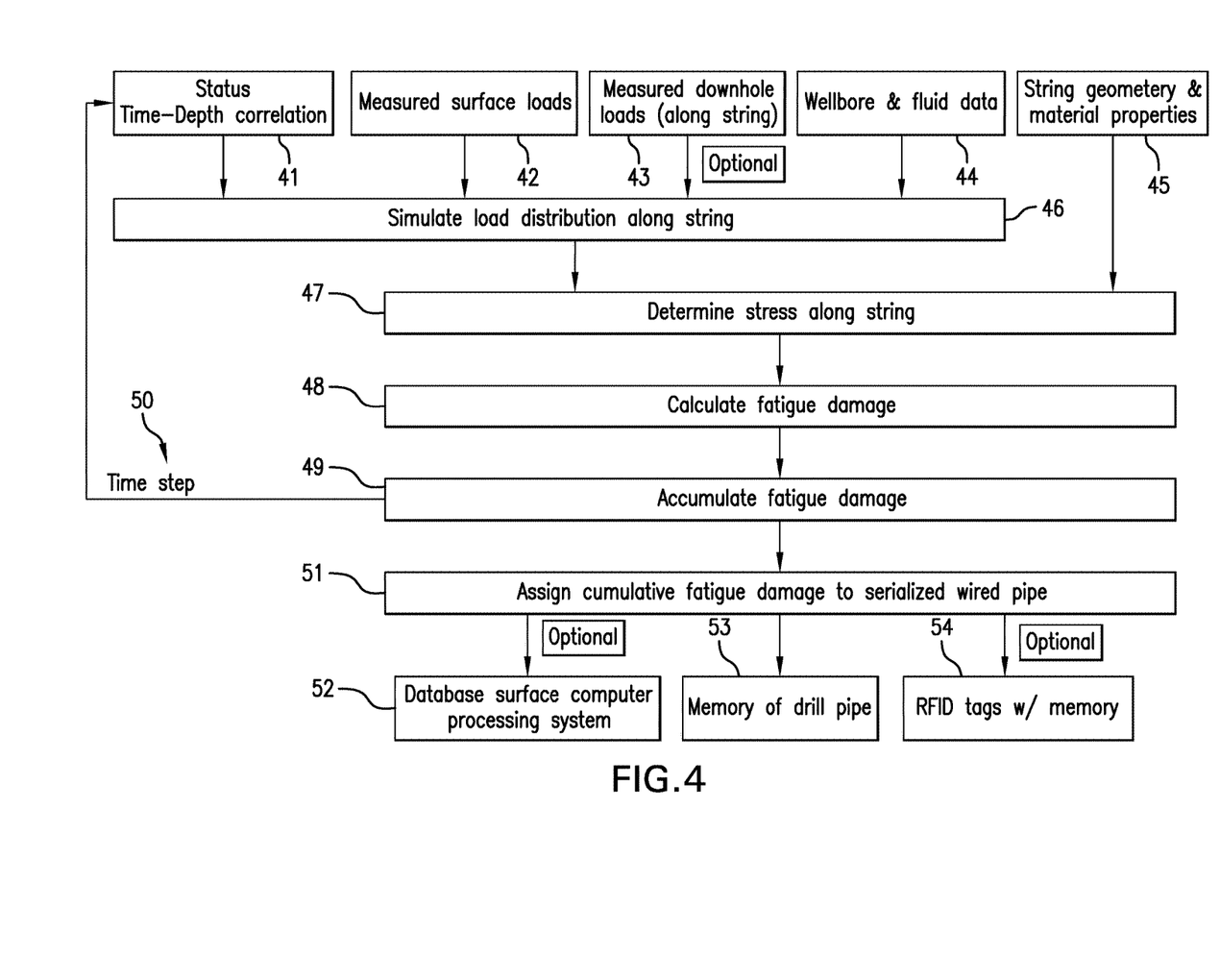
FIG. 4 is a flow chart for fatigue life workflow for a drill pipe in the drill string.

FIG. 4 is a flow chart for fatigue life workflow for a drill pipe 8 in the drill string 9. The blocks in FIG. 4 are implemented using a processor such as in the surface computer processing system 12 or a downhole processor such as in the drill-pipe electronic unit 20. Block 41 calls for receiving status of the drilling system 10 and/or the drill rig 6. This step generally includes correlating the time with the depth (inclusive of distance into the borehole) of the drill pipe 8 in the borehole 2. The status in general relates to factors affecting the drill string 9 as the borehole 2 is being drilled, by way of non-limiting example, such as rotary drilling, drilling in sliding mode, rotation off bottom, pulling out of hole, running in hole, circulating off bottom, back-reaming, etc. Block 42 calls for receiving measured surface loads such as measured with the surface sensor 11 or other surface measured drilling information. Block 43 calls for optionally receiving measured downhole loads along the drill string 9. The loads may be measured at known locations on drill pipes 8 in the drill string 9. Block 44 calls for receiving wellbore and drilling fluid data including a fluid density and/or fluid composition, allowing determination of frictional load transfer losses between the drill string 9 or drill pipe 8 and the wellbore wall. Wellbore data includes information about whether or not the wellbore contains a casing string or the drill string is located in open formation. The wellbore data further includes information on the wellbore diameter and the wellbore trajectory including depth, azimuth and inclination. Block 45 calls for receiving a geometry and material properties of the drill string 9. Non-limiting embodiments of the geometric properties include drill string weight, length and outer and inner diameter along the length of the drill string. Non-limiting embodiments of the material properties include material density and strength.

Block 46 calls for simulating load distribution along the drill string using the drill system 10 and/or drill rig 6 status, the time-depth correlation assigned to each measurement, the measured surface loads, the wellbore and drilling fluid data, and optionally the measured downhole loads. Block 47 calls for determining stress along the drill string 9 using the simulated load distribution along the drill string 9 and the drill string geometry and material properties as inputs. In general, the stress is determined at various points along the drill string 9 to include some or all the drill pipes 8 making up the drill string 9. The points may be evenly spaced or clustered at points of interest such as coupling sections (e.g., box end and pin end) of the drill pipes 8. Points of interest may include those points that are most susceptible to stress and fatigue.

Block 48 calls for calculating fatigue damage for drill pipes in the drill string at the points along the drill string using the determined stress. In one or more embodiments, the fatigue damage may be an ordered set of values for different factors related to material fatigue. For example, the fatigue damage may be represented by an ordered set of two values—a first value for a stress amplitude and a second value for a number of cycles the material has undergone at the stress amplitude listed as the first value. In one or more embodiments for simplification purposes, a maximum stress amplitude may be determined and used as the first value while the number of cycles at the maximum stress amplitude or less than the maximum stress amplitude may be used as the second value. In one or more embodiments, the number of cycles of stress is calculated using a frequency of rotation of the drill string and a duration of time in a time step used for calculating the fatigue damage within the time step. For example, a number of cycles in the time step can be calculated by multiplying the frequency of rotation times the time duration of the time step.

Block 49 calls for accumulating (e.g., by addition) the fatigue damage for each of the points to a corresponding previous accumulated fatigue damage for each of those points to provide a cumulative fatigue damage for each of those points. In one or more embodiments, if the maximum stress amplitude remains unchanged, then the accumulating may be accomplished by adding the number of cycles in the present time step to the number of previously accumulated cycles. If the maximum stress amplitude changes, then the number of cycles for each corresponding stress amplitude can be tracked and a conversion factor can be used to relate the cumulative fatigue damage resulting from a first amplitude and a first number of cycles to the cumulative fatigue damage resulting from a second amplitude and a second number or cycles.

Block 50 calls for incrementing the time step in order to update the status of the drilling system 10 and/or the drill rig 6, the measured surface loads, optionally the measured downhole loads, and the wellbore and fluid data and iterating, using the updated information, the simulating load distribution, the determining stress, the calculating a fatigue damage, and the accumulating the fatigue damage.

Block 51 calls for assigning the cumulative fatigue damage to a corresponding drill pipe 8 for which the cumulative fatigue damage is associated. As noted above, each drill pipe 8 may have a unique address such as a serial number in order to specifically identify each drill pipe 8.

Block 52 calls for optionally inputting the assigned cumulative fatigue damage for the corresponding drill pipe 8 into a database of a surface computer processing system. Block 53 calls for writing the assigned cumulative fatigue damage for the corresponding drill pipe 8 into a memory disposed on the corresponding drill pipe 8. Block 54 calls for optionally writing the assigned cumulative fatigue damage for the corresponding drill pipe 8 into a memory of an RFID tag disposed on the corresponding drill pipe 8.

Once the cumulative fatigue damage is calculated for a specific drill pipe 8, that specific drill pipe 8 can be evaluated for future operation. An evaluation may include determining how close the cumulative fatigue damage is to a fatigue limit or threshold also referred to as an endurance limit, which may indicate a high or unacceptable probability of failure. If the cumulative fatigue damage is within a selected or specified range of a fatigue limit, also referred to as a pre-selected level of a fatigue limit or a pre-selected level of an endurance limit, then the specific drill pipe 8 may be taken out of service and inspected using known inspection equipment (not shown) such as non-destructive testing equipment for identifying and quantifying cracks. Non-limiting embodiments of the inspection equipment include dye test equipment, X-ray equipment, and ultrasound test equipment. Depending on the condition determined by the inspection, the specific drill pipe 8 may be reworked or scrapped.

Figure 5:
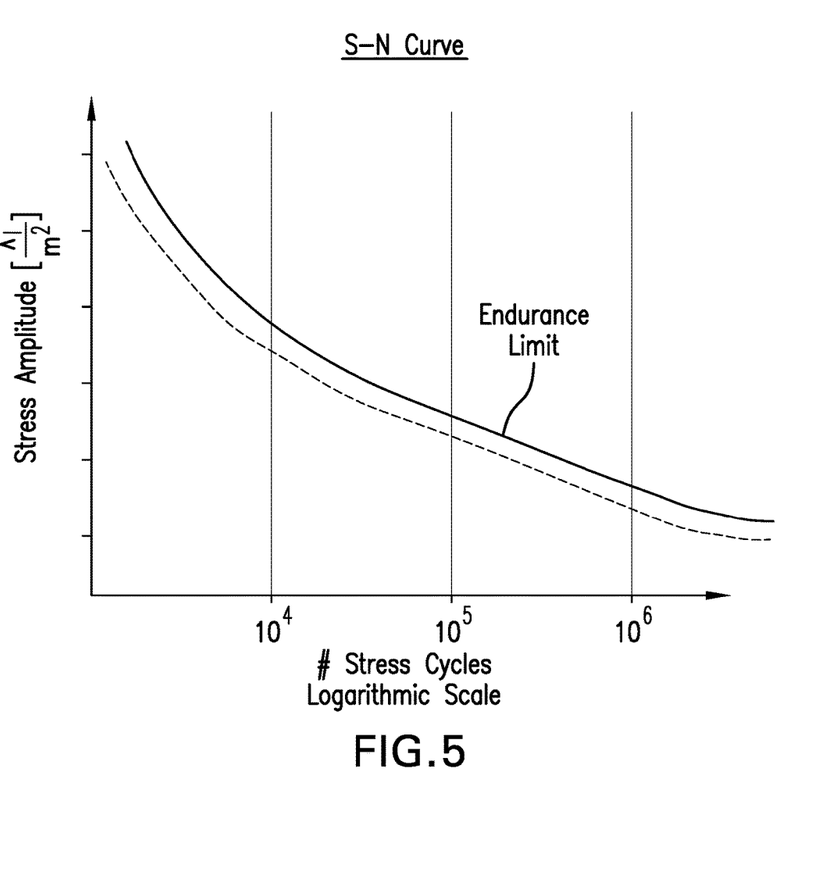
FIG. 5 depicts aspects of a stress versus number of stress cycles curve for a drill pipe.

FIG. 5 depicts aspects of a stress amplitude versus a number of cycles curve for determining the cumulative fatigue damage of the specific drill pipe 8. This curve has an endurance limit or threshold plotted, which indicates a high probability of failure. Data points to the left and below the endurance limit curve indicate a lower probability of failure. A dashed line indicates a pre-selected level of the endurance limit, which includes a margin to account for accuracy, such that data points on the dashed line or to the left or below the dashed line indicate a low probability of failure.

The endurance limit may be temperature dependent. Hence, a series of curves may be required to cover various expected downhole temperatures.

In that the curves are also dependent on the material of the drill pipe 8, analysis (e.g., finite element analysis) or testing may be used to determine these curves. The analysis and/or testing may be performed for the various expected downhole temperatures or range of downhole temperatures. When the downhole sensor 24 senses temperature, the sensed temperature may be provided as input in order to select the appropriate endurance limit curve and the associated pre-selected level of the endurance limit for which to evaluate each specific drill pipe 8. Sensed downhole temperatures may be needed if the downhole temperatures are already known or known to be within a certain range. In this case, the highest downhole known temperature may be used as a conservative estimate.

Figure 6A:
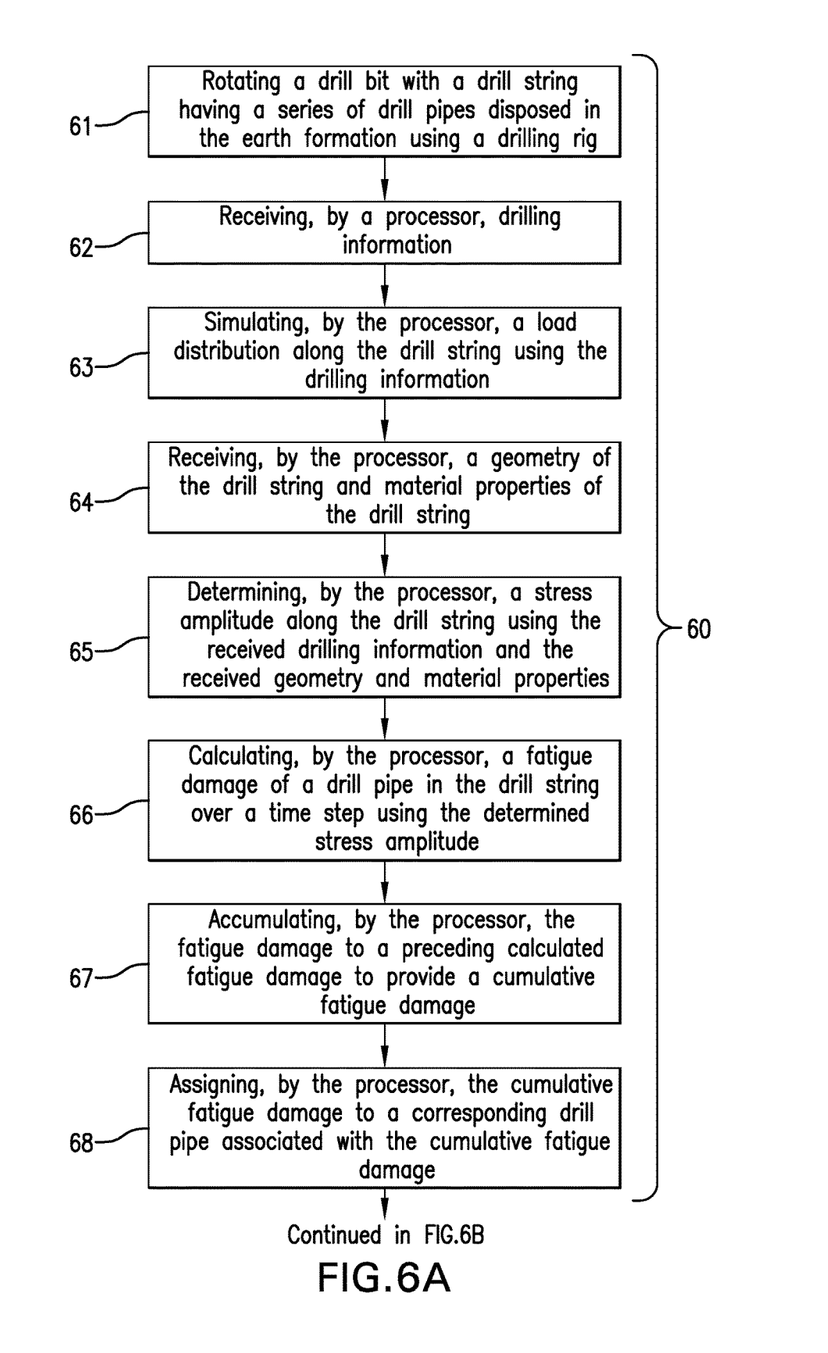
FIGS. 6A and 6B, collectively referred to as FIG. 6, present a flow chart for a method for drilling a borehole in an earth formation.
Figure 6B:
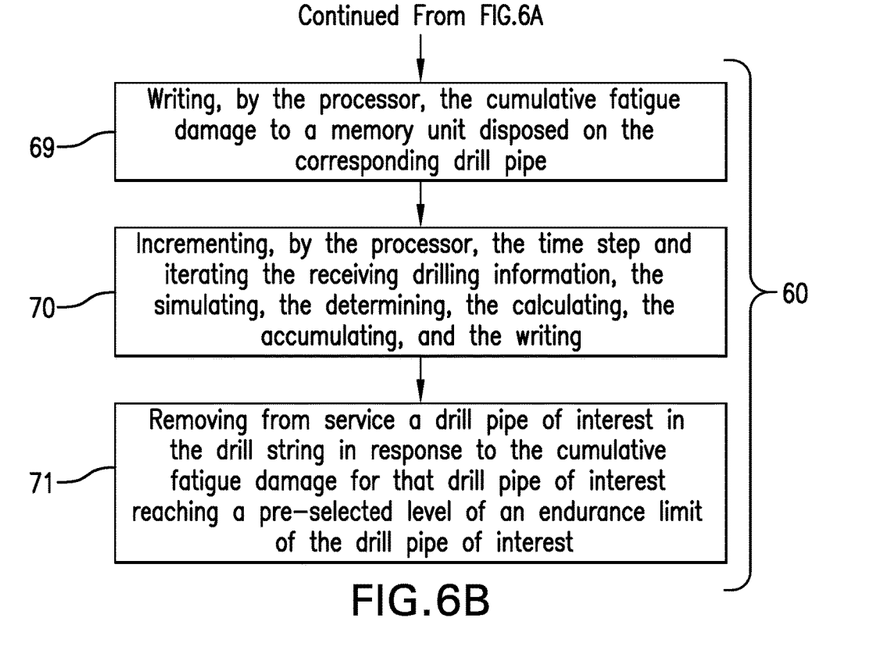

FIGS. 6A and 6B present a flow chart for a method 60 for drilling a borehole in an earth formation. Block 61 calls for rotating a drill bit with a drill string having a series of drill pipes disposed in the earth formation using a drilling rig. Block 62 calls for receiving, by a processor, drilling information. Block 63 calls for simulating, by the processor, a load distribution along the drill string using the drilling information. Block 64 calls for receiving, by the processor, a geometry description of the drill string and material properties of the drill string. Block 65 calls for determining, by the processor, a stress amplitude along the drill string using the received drilling information and the received geometry and material properties. Block 66 calls for calculating, by the processor, a fatigue damage of a drill pipe in the drill string over a time step using the determined stress amplitude. Block 67 calls for accumulating, by the processor, the fatigue damage to a preceding calculated fatigue damage to provide a cumulative fatigue damage. Block 68 calls for assigning, by the processor, the cumulative fatigue damage to a corresponding drill pipe associated with the cumulative fatigue damage. Block 69 calls for writing, by the processor, the cumulative fatigue damage to a memory unit disposed on the corresponding drill pipe. Block 70 calls for incrementing, by the processor, the time step and iterating the receiving drilling information, the simulating, the determining, the calculating, the accumulating, and the writing. Block 71 calls for removing from service a drill pipe of interest in the drill string in response to the cumulative fatigue damage for that drill pipe of interest reaching a pre-selected level of an endurance limit of the drill pipe of interest.

The method 60 may also include transmitting a signal from the processor to a user interface, warning a user, if the cumulative fatigue damage reaches the pre-selected level of the fatigue limit.

The method 60 may also include inspecting the drill pipe removed from service using inspection equipment.

The method 60 may also include communicating a signal comprising the cumulative fatigue damage from a specific drill pipe to a surface computer processing system in response to a request from the surface computer processing system.

The method 60 may also include writing the cumulative fatigue damage to the memory of a radio-frequency identification (RFID) tag. The method 60 may also include reading the memory of the RFID tag using an RFID tag reader when the drill pipe having the RFID tag is retrieved from the borehole.

In addition to simulating mechanical stress distribution along the drill string, the method 60 may also include using the mud temperature-in and mud temperature-out, measured at the surface, to simulate the temperature distribution along the drill string. In an analog procedure as described by the flow chart in FIG. 4 a cumulative temperature induced aging information may be determined, which may be assigned to a particular drill pipe. The method may be improved when downhole temperature data is provided by at least one downhole temperature sensor. A drill pipe of interest in the drill string may be removed from service in response to the cumulative temperature induced aging information reaching a pre-selected level of a temperature induced aging information limit of the drill pipe of interest. This method is particularly of interest for drill pipes that have components disposed which are degrading faster with time at elevated temperatures such as means of sealing (O-rings) or other drill pipe components made of elastomers or synthetic materials as a non-limiting example.

The method of simulating the mechanical stress or temperature distribution along the drill string may also include using the mud pressure-in and mud pressure-out, measured at the surface, to simulate the differential pressure distribution along the drill string. In an analog procedure as described in the flow chart in FIG. 4 a cumulative differential pressure fatigue damage may be determined, which may be assigned to a particular drill pipe. The method may be improved when downhole pressure data is provided by at least one downhole pressure sensor. A drill pipe of interest in the drill string may be removed from service in response to the cumulative differential pressure fatigue damage reaching a pre-selected level of a differential pressure fatigue limit of the drill pipe of interest.

The above apparatus and method provide several advantages. One advantage is that a warning, also referred to as an alert signal, may be provided to a user that a specific drill pipe may be coming close to a pre-selected level of a fatigue limit so that the specific drill pipe can be withdrawn from service and scrapped or repaired before actually failing during operation. By way of non-limiting example, a pre-selected level of a fatigue limit may be 70% of the fatigue limit. If the cumulative fatigue damage reaches 70% of the fatigue limit, a warning is provided. Another advantage is that a history, such as a cumulative fatigue damage history, of each specific drill pipe can be continuously tracked as the specific drill pipe is used for different drilling jobs.

Embodiment 1

An apparatus for drilling a borehole in an earth formation, the apparatus comprising: a plurality of drill pipes configured to be coupled together to form a drill string that is configured to convey an earth formation disintegrating device while progressing into the earth formation; a communication medium disposed on the drill string and configured to communicate a signal; and one or more processors configured to: receive drilling information; determine a stress distribution along at least a part of the drill string using the drilling information; determine a cumulative fatigue damage of at least a part of one drill pipe in the drill string using the stress distribution; and write the cumulative fatigue damage of the at least a part of one drill pipe to a memory.

Embodiment 2

The apparatus according to any prior embodiment, wherein the apparatus further comprises a surface computer processing system and the one or more processors are further configured to write the cumulative fatigue damage to a data base in the surface computer processing system.

Embodiment 3

The apparatus according to any prior embodiment, wherein the one or more processors are configured to write an identifier of the at least a part of one drill pipe associated with the cumulative fatigue damage to the data base.

Embodiment 4

The apparatus according to any prior embodiment, wherein the memory is disposed on one or more drill pipes in the plurality of drill pipes.

Embodiment 5

The apparatus according to any prior embodiment, wherein the memory disposed on the one or more drill pipes in the plurality of drill pipes is an RFID memory in a radio-frequency identification (RFID) tag.

Embodiment 6

The apparatus according to any prior embodiment, wherein the communication medium comprises at least one of an electrical conductor, and an optical fiber.

Embodiment 7

The apparatus according to any prior embodiment, wherein communicating the signal is executed at least partially by electromagnetic telemetry.

Embodiment 8

The apparatus according to any prior embodiment, wherein at least one processor of the one or more processors is located in the drill string.

Embodiment 9

The apparatus according to any prior embodiment, wherein the drilling information comprises at least one of a surface torque, an axial load, a rotational speed, a temperature-in, a temperature-out, a pressure-in, a pressure-out, a time, and a depth.

Embodiment 10

The apparatus according to any prior embodiment, wherein the drilling information further comprises at least one of wellbore data and drilling fluid data, the drilling fluid data comprising at least one of a fluid density and a fluid composition, the wellbore data comprising at least one of a wellbore diameter, a wellbore trajectory, and information about whether or not the wellbore contains a casing string.

Embodiment 11

The apparatus according to any prior embodiment, wherein the drilling information comprises at least one of a downhole bending moment, downhole torque, downhole acceleration, downhole axial load, downhole temperature, and downhole pressure on one or more drill pipes in the plurality of drill pipes.

Embodiment 12

The apparatus according to any prior embodiment, wherein the processor is further configured to determine temperature induced cumulative aging information using the downhole temperature.

Embodiment 13

The apparatus according to any prior embodiment, wherein the processor is further configured to determine whether a pre-selected level of a fatigue limit of the at least a part of one drill pipe is reached using the cumulative fatigue damage for the at least a part of one drill pipe.

Embodiment 14

The apparatus of any prior embodiment, wherein the processor is further configured to send a signal to a user interface warning a user when the cumulative fatigue damage reaches the pre-selected level of a fatigue limit.

Embodiment 15

The apparatus according to any prior embodiment, wherein the drilling information comprises at least one of a geometry of the drill string and a material property of the plurality of drill pipes in the drill string.

Embodiment 16

A method for drilling a borehole in an earth formation, the method comprising: conveying an earth formation disintegrating device while progressing into the earth formation using a plurality of drill pipes configured to be coupled together to form a drill string; communicating a signal using a communication medium disposed on the drill string; receiving with one or more processors drilling information; determining with the one or more processors a stress distribution along at least a part of the drill string using the drilling information; determining with the one or more processors a cumulative fatigue damage of at least a part of one drill pipe in the drill string using the stress distribution; and writing with the one or more processors the cumulative fatigue damage of the at least a part of one drill pipe to a memory.

Embodiment 17

The method according to any prior embodiment, wherein the memory is an RFID memory in a radio-frequency identification (RFID) tag disposed on one or more drill pipes in the plurality of drill pipes and the method further comprises reading the memory of the RFID tag using an RFID tag reader when the drill pipe having the RFID tag is retrieved from the borehole.

Embodiment 18

The method according to any prior embodiment, further comprising determining whether a pre-selected level of a fatigue limit of the at least a part of one drill pipe is reached using the cumulative fatigue damage for the at least a part of one drill pipe.

Embodiment 19

The method according to any prior embodiment, further comprising sending a signal to a user interface warning a user when the cumulative fatigue damage reaches the pre-selected level of a fatigue limit.

Embodiment 20

The method according to any prior embodiment, further comprising removing one or more drill pipes of the plurality of drill pipes out of service when the cumulative fatigue damage of the at least a part of one or more drill pipes reaches the pre-selected level of a fatigue limit.

In support of the teachings herein, various analysis components may be used including a digital and/or an analog system. For example, the surface computer processing system 12, the transceiver 14, the drill-pipe electronic unit 20, the RFID tag 23, the RFIG tag reader 26, the surface sensor 11, and/or the downhole sensor 24 may include digital and/or analog systems. The system may have components such as a processor, storage media, memory, input, output, communications link (wired, wireless, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. Processed data such as a result of an implemented method may be transmitted as a signal via a processor output interface to a signal receiving device. The signal receiving device may be a display monitor or printer for presenting the result to a user.

Further, an alert signal may be transmitted from the processor to a user interface if the result exceeds a pre-selected limit.

Further, various other components may be included and called upon for providing for aspects of the teachings herein. For example, a sensor, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first' and "second" are not intended to denote a specific order, but are used to distinguish between different elements.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for drilling a borehole in an earth formation, the apparatus comprising:
    a plurality of drill pipes configured to be coupled together to form a drill string that is configured to convey an earth formation disintegrating device while progressing into the earth formation;
    one or more processors configured to:
        receive torque information measured by a sensor disposed at or above a surface of the earth while the drill string is off bottom;
        determine a frictional load transfer loss along at least a part of the drill string using the torque information;
        receive drilling information while the drill string is drilling;
        determine a stress distribution along at least a part of the drill string using the drilling information and the frictional load transfer loss;
        determine a cumulative fatigue damage of at least a part of one drill pipe in the drill string using the stress distribution; and
        write the cumulative fatigue damage of the at least a part of one drill pipe to a memory.

2. The apparatus according to claim 1, wherein the apparatus further comprises a surface computer processing system and the one or more processors are further configured to write the cumulative fatigue damage to a data base in the surface computer processing system.

3. The apparatus according to claim 2, wherein the one or more processors are configured to write an identifier of the at least a part of one drill pipe associated with the cumulative fatigue damage to the data base.

4. The apparatus according to claim 1, wherein the memory is disposed on one or more drill pipes in the plurality of drill pipes.

5. The apparatus according to claim 4, wherein the memory disposed on the one or more drill pipes in the plurality of drill pipes is an RFID memory in a radio-frequency identification (RFID) tag.

6. The apparatus according to claim 1, further comprising a communication medium disposed on the drill string and configured to communicate a signal, the communication medium comprising at least one of an electrical conductor, and an optical fiber.

7. The apparatus according to claim 1, further comprising a communication medium disposed on the drill string and configured to communicate a signal, wherein communicating the signal is executed at least partially by electromagnetic telemetry.

8. The apparatus according to claim 1, wherein at least one processor of the one or more processors is located in the drill string.

9. The apparatus according to claim 1, wherein the drilling information comprises at least one of a torque, an axial load, a rotational speed, a temperature-in, a temperature-out, a pressure-in, a pressure-out, a time, and a depth.

10. The apparatus according to claim 9, wherein the drilling information further comprises at least one of wellbore data and drilling fluid data, the drilling fluid data comprising at least one of a fluid density and a fluid composition, the wellbore data comprising at least one of a wellbore diameter, a wellbore trajectory, and information about whether or not the wellbore contains a casing string.

11. The apparatus according to claim 1, wherein the drilling information comprises at least one of a downhole bending moment, downhole torque, downhole acceleration, downhole axial load, downhole temperature, and downhole pressure on one or more drill pipes in the plurality of drill pipes.

12. The apparatus according to claim 11, wherein the processor is further configured to determine temperature induced cumulative aging information using the downhole temperature.

13. The apparatus according to claim 1, wherein the processor is further configured to determine whether a pre-selected level of a fatigue limit of the at least a part of one drill pipe is reached using the cumulative fatigue damage for the at least a part of one drill pipe.

14. The apparatus of claim 13, wherein the processor is further configured to send a signal to a user interface warning a user when the cumulative fatigue damage reaches the pre-selected level of a fatigue limit.

15. The apparatus according to claim 1, wherein the drilling information comprises at least one of a geometry of the drill string and a material property of the plurality of drill pipes in the drill string.

16. A method for drilling a borehole in an earth formation, the method comprising:
 conveying an earth formation disintegrating device while progressing into the earth formation using a plurality of drill pipes configured to be coupled together to form a drill string;
 receiving with one or more processors torque information measured by a sensor disposed at or above a surface of the earth while the drill string is off bottom;
 determining with the one or more processors a frictional load transfer loss along at least a part of the drill string using the torque information;
 receiving with the one or more processors drilling information while the drill string is drilling;
 determining with the one or more processors a stress distribution along at least a part of the drill string using the drilling information and the frictional load transfer loss;
 determining with the one or more processors a cumulative fatigue damage of at least a part of one drill pipe in the drill string using the stress distribution; and
 writing with the one or more processors the cumulative fatigue damage of the at least a part of one drill pipe to a memory.

17. The method according to claim 16, wherein the memory is an RFID memory in a radio-frequency identification (RFID) tag disposed on one or more drill pipes in the plurality of drill pipes and the method further comprises reading the memory of the RFID tag using an RFID tag reader when the drill pipe having the RFID tag is retrieved from the borehole.

18. The method according to claim 16, further comprising determining whether a pre-selected level of a fatigue limit of the at least a part of one drill pipe is reached using the cumulative fatigue damage for the at least a part of one drill pipe.

19. The method according to claim 18, further comprising sending a signal to a user interface warning a user when the cumulative fatigue damage reaches the pre-selected level of a fatigue limit.

20. The method according to claim 19, further comprising removing one or more drill pipes of the plurality of drill pipes out of service when the cumulative fatigue damage of the at least a part of one or more drill pipes reaches the pre-selected level of a fatigue limit.

21. The method according to claim 16, further comprising communicating a signal comprising the cumulative fatigue damage of at least a part of one drill pipe in the drill string to at least one of (i) the memory from the one or more processors and (ii) the one or more processors from the memory using a communication medium disposed on the drill string, wherein memory is disposed on the one drill pipe in the drill string.

* * * * *